P. B. BONNETTE.
CATTLE STANCHION.
APPLICATION FILED OCT. 28, 1911.

1,040,864.

Patented Oct. 8, 1912.
2 SHEETS—SHEET 1.

Witnesses
H. H. Lybrand
R. B. Cavanagh

Inventor
Perry B. Bonnette

By Victor J. Evans
Attorney

P. B. BONNETTE.
CATTLE STANCHION.
APPLICATION FILED OCT. 28, 1911.
1,040,864.
Patented Oct. 8, 1912.
2 SHEETS—SHEET 2.
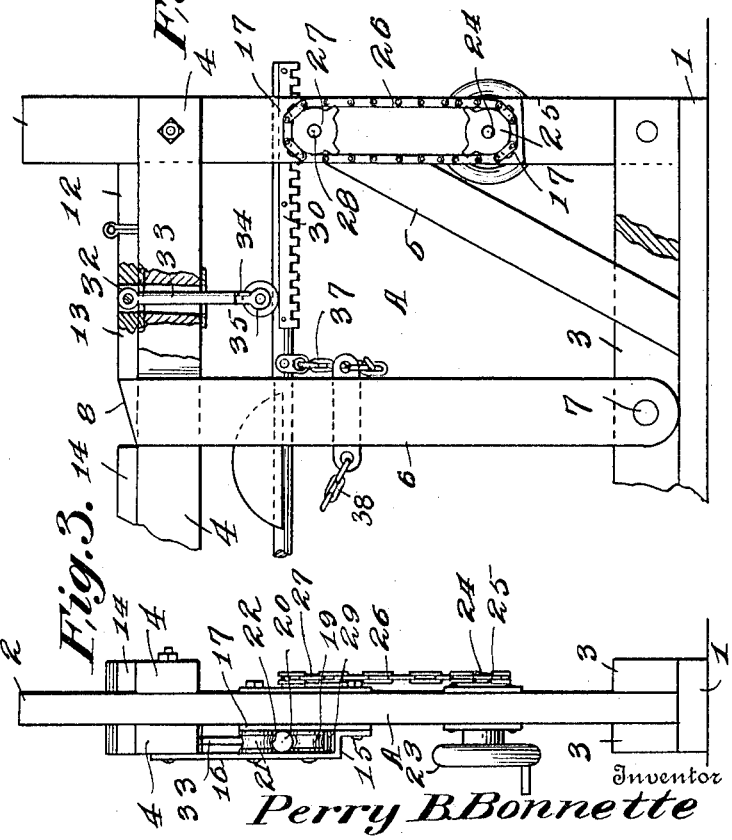
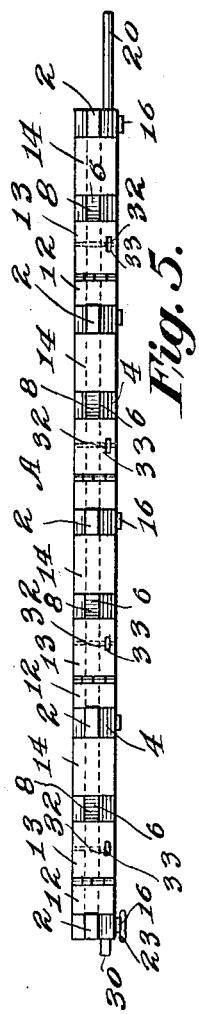
Inventor
Perry B. Bonnette
Witnesses
H. H. Lybrand
R. B. Cavanagh
By Victor J. Evans
Attorney

UNITED STATES PATENT OFFICE.

PERRY B. BONNETTE, OF CHICAGO, ILLINOIS.

CATTLE-STANCHION.

1,040,864.  Specification of Letters Patent.  Patented Oct. 8, 1912.

Application filed October 28, 1911. Serial No. 657,207.

*To all whom it may concern:*

Be it known that I, PERRY B. BONNETTE, a citizen of the United States, residing at Chicago, in the county of Cook and State of Illinois, have invented new and useful Improvements in Cattle-Stanchions, of which the following is a specification.

The present invention relates to certain novel and useful improvements in cattle stanchions, and has particular application to improvements whereby all the cattle may be simultaneously released from the stanchion at one operation of the device.

In carrying out my invention, it is my purpose to provide a cattle stanchion whereby the cattle may be fastened in the stanchion at once, thereby avoiding the necessity of fastening each individual animal, and, furthermore, as above mentionel, all of the cattle may be released at one time.

It is also my purpose to provide a device which will embrace the desired features of simplicity, durability and efficiency, and which may be operated with a minimum expenditure of time and labor.

Furthermore, I aim to provide operating mechanism which may be supplied to any ordinary type of stanchion.

With the above recited objects, and others of a similar nature in view, the invention consists in the construction, combination and arrangement of parts, set forth in and falling within the scope of the appended claims.

Figure 1:
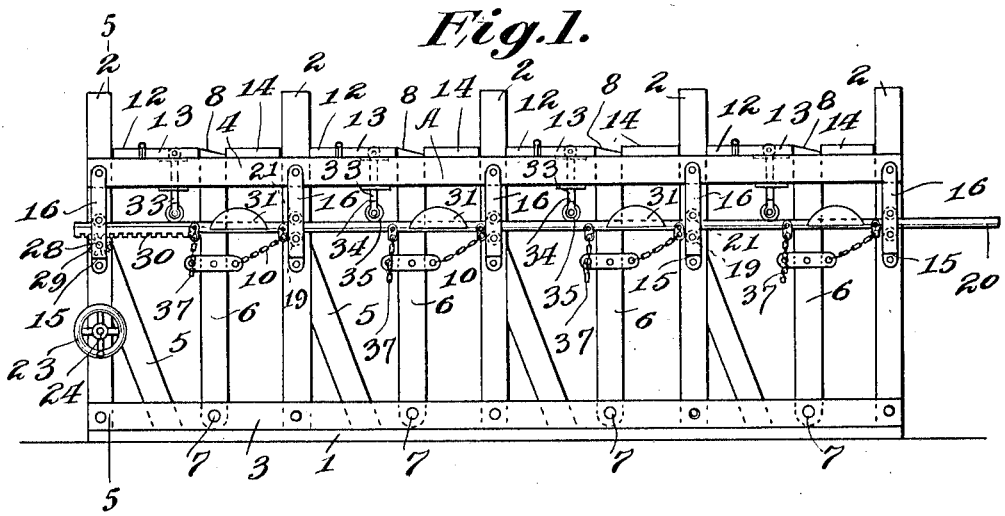
Figure 2:
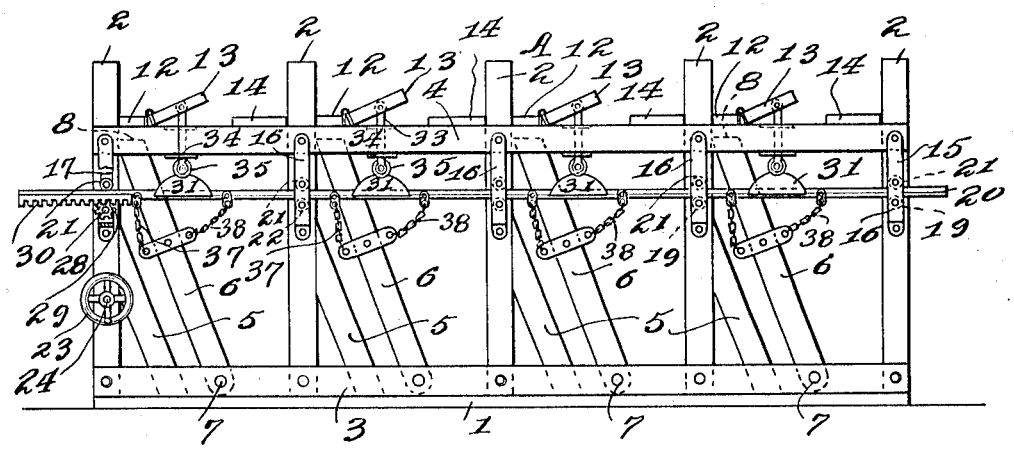

In the accompanying drawing:—Figure 1 is a front elevation of my improved cattle stanchion, showing the same in locked or closed position. Fig. 2 is a similar view, showing the stanchion in its open or released position. Fig. 3 is an end view thereof. Fig. 4 is a rear view of a portion of the stanchion, showing the connection between the operating shaft and the sliding rod actuated thereby. Fig. 5 is a plan view. Fig. 6 is a vertical cross sectional view taken through the stanchion on the line 5—5 of Fig. 1.

Referring now to the accompanying drawings in detail, the letter A designates the stanchion frame as an entirety comprising the base beam 1, the vertical stationary standards 2 extending from the base beam, the bottom cross bars 3, which are spaced apart and secured at opposite sides of the standards 2, and the top cross bars 4 which are similar in construction and arrangement to the bottom cross bars. The inclined brace bars for the stanchion frame are indicated by the numeral 5 and extend from the vertical standards to the base beam. The movable locking bars for the stanchion are shown at 6 and comprise vertically extending members pivoted as at 7 between the bottom cross bars 3, the upper ends of said pivoted locking bars being beveled or inclined as at 8 and project up between the top cross bars 4. These pivoted bars are normally in locking position when extending vertically and the head of the cattle is held between the pivoted locking bar and the adjacent or nearest stationary standard. Secured to the top edge of and connecting the top cross bars are rectangular blocks 12, to each of which is pivotally connected a locking block 13, said locking block being adapted when in its lowered position and resting upon the top edge of the cross bars to lock the vertical pivoted bars in position, the blocks 14 which are also secured upon the top edges of the top cross bars limiting the backward movement of the locking bars 6 so that the beveled top edges of the locking bars are secured between the pivoted blocks 13 and the stationary blocks 14.

In order to permit the swinging movement of the pivoted locking bars 6 to release or lock the cattle in the stanchion, it is necessary to swing the pivot blocks 13 out of locking position and to swing the locking bars 6 upon their pivots, and this is accomplished as follows:—Secured to the front of each of the vertical stationary standards is an angle bracket 15 one end of the long vertical arm 16 of which is fastened to the adjacent longitudinal cross bar 4. Secured to the front face of each of the stationary standards is a bearing plate 17 having an opening 18 therein for the reception of the end of the roller 19, the opposite end of the roller being journaled in the arm 16 of the bracket. It will thus be seen that each of the standards is provided with a roller bearing, for supporting the operating rod 20 which may be formed of any suitable material such as tubing or the like. The stationary standard at the inner end of the stanchion is also provided in addition to the bearing roller with a top roller 21 journaled in the manner just described for the other rollers, and between which two rollers the end of the operating rod rides and is guided. The periphery of each of the rollers is preferably concaved as is shown at 22 to form a suitable bearing surface for the operating rod.

In order to reciprocate the rod back and forth, I provide the following means:—The numeral 23 indicates a hand wheel carried at the forward end of the short shaft 24 which is journaled in the front standard 2 of the stanchion, said shaft 24 carrying at its rear end the sprocket wheel 25 driving the endless chain 26 which chain passes over and drives the sprocket 27 carried on the shaft 28 which projects through the standards, the opposite or front end of the shaft 28 carrying a small cog wheel 29 adapted to mesh with the rack bar 30 formed at the outer or forward end of the operating rod. From this arrangement, it will be seen that when the hand wheel is operated in one direction or to the right, the operating rod or tube will be forced or moved inward, while when the direction of rotation of the hand wheel is reversed, such operating rod will be moved outward or withdrawn.

Mounted upon the top surface of the rod at suitable distances apart are the cam blocks 31 which are adapted to move the pivoted blocks 13 out of locking engagement with the pivoted locking bars 6 in the following manner. Directly beneath each locking pivoted block 13 the front cross bar 4 is formed with a vertical, preferably rectangular slot 32 extending centrally therethrough and movably mounted in each slot is a rectangular arm 33 depending below the lower edge of the cross bar 4 and terminating in a yoke 34 carrying the roller 35. The top end of each arm is pivotally connected to the respective pivoted locking block. When the operating rod is moved forward to cause the cam blocks to contact with the rollers carried by the depending arms, said arms are pushed or forced upward in their slots, thus throwing the same the pivoted locking blocks 13 and throwing the same up and out of locking engagement, as shown in Fig. 2, thereby releasing the pivoted stanchion bars. In order to swing the bars 6 on their pivots into and out of locking position, each bar is connected to the operating rod through the medium of two short oppositely disposed chain sections 37 and 38, respectively, so that when the operating rod is moved outward, the pull of the chain 37 will swing the pivoted stanchion bars outward to release the head of the animal, while when the operating rod is moved inward, the pull on the chain 10 will draw the pivoted stanchion bar into locking position.

From the above description, taken in connection with the accompanying drawing, the construction and manner of employing my invention will be readily apparent. Assuming the stanchion to be in locking position as shown in Fig. 1, to release the pivoted locking bars, the hand wheel 4 is rotated so that motion is imparted through the sprocket and chain device to the cog wheel, which, working in the rack bar of the operating rod moves the latter outward thereby causing the cam blocks to contact with the rollers of the operating arms of the pivoted locking blocks, moving the locking blocks upward to the position shown in Fig. 2. The continued movement of the operating rod tightens the chains 37 and causes all of the pivoted stanchion bars to be simultaneously moved outward on the pivots or released. By reversing the movement of the arms of the hand wheel, the operating rod is shifted in the opposite direction, drawing away the cam blocks from contact with the rollers on the operating arms of the pivoted locking block permitting these pivoted blocks to drop back in opposite position by gravity, the pivoted stanchion bars having been drawn into vertical locking position by means of the chains 38.

It will be noted that I have provided a simple yet efficient form of stanchion by means of which any number of animals may be secured or released at one operation or without the necessity of fastening and releasing each individual animal. This not only saves a great loss of time and labor but also provides means for the quick releasing of the animals in case of emergency such, for instance, as a fire.

I claim:—

1. In a cattle stanchion, the combination of stationary standards and pivoted stanchion bars arranged adjacent thereto, roller bearings carried by said stationary standards, an operating rod mounted in said bearings and adapted to reciprocate therein, flexible connections between said rod and stanchion bars to move the latter to operative and inoperative position, means for reciprocating said rod, movable locking members located adjacent the ends of the bars and adapted to bear against the same, a vertical arm depending from each locking member, and a plurality of cams carried by said rod and adapted to engage said arms to release the stanchion bars from the influence of the locking members in the movement of the operating rod in one direction.

2. In a cattle stanchion, the combination with stationary standards and pivoted stanchion bars arranged adjacent thereto, a longitudinally movable operating rod, connections between said rod and the individual stanchion bars, means for shifting said rod longitudinally to swing the bars, said means comprising a rack formed integral with one end of the bar, a pinion engaging said rack, a chain and sprocket mechanism for rotating the pinion, locking means for the bars comprising a series of pivoted blocks and stationary abutment blocks each coöperating with a pivoted block to receive the ends of the stanchion bars and hold the same in locked position, a vertical sliding arm connected to each pivoted locking block and provided with a roller, and cam blocks on the operating rod adapted to contact in the movement of the rod with the rollers to shift the arms and lift the blocks out of locking position.

3. In a cattle stanchion, a stanchion frame comprising a base, vertical stationary standards extending from the base and top cross bars spaced apart and secured to the opposite sides of the said stationary standards, movable stanchion bars adjacent to the stationary standards and pivoted to the base, bearings on said stationary standards, a longitudinally movable operating rod in said bearings, connections between said rod and the individual stanchion bars, means for shifting said rod longitudinally to swing the bars, locking blocks pivotally mounted upon the spaced top cross bars, an arm depending from each of said blocks, stationary abutment blocks coöperating with the pivoted blocks and adapted to receive the ends of the stanchion bars to hold the same in locked position, cam blocks on the operating rod and adapted to engage said arms to elevate the pivoted locking blocks to release the stanchion bars.

In testimony whereof I affix my signature in presence of two witnesses.

PERRY B. BONNETTE.

Witnesses:
ALBERT W. BRICKWOOD,
WILLIAM E. FURNESS.

Copies of this patent may be obtained for five cents each, by addressing the "Commissioner of Patents, Washington, D. C."